(12) United States Patent
Shahar et al.

(10) Patent No.: US 6,892,016 B2
(45) Date of Patent: May 10, 2005

(54) OPTICAL THRESHOLD DEVICES AND METHODS

(75) Inventors: Arie Shahar, Rye Brook, NY (US); Eldan Halberthal, Rye Brook, NY (US)

(73) Assignee: Prima Luci, Inc., White Plains, NY (US)

( * ) Notice: Subject to any disclaimer, the term of this patent is extended or adjusted under 35 U.S.C. 154(b) by 181 days.

(21) Appl. No.: 10/404,077

(22) Filed: Apr. 2, 2003

(65) Prior Publication Data

US 2004/0037524 A1 Feb. 26, 2004

Related U.S. Application Data

(60) Provisional application No. 60/405,697, filed on Aug. 22, 2002.

(51) Int. Cl.[7] .................................................. G02B 6/00
(52) U.S. Cl. ........................ 385/122; 385/14; 385/129; 385/130; 385/42; 385/40; 385/41; 385/140; 385/3
(58) Field of Search .......................... 385/122, 14, 129, 385/130, 131, 132, 140, 40, 41, 42, 3

(56) References Cited

U.S. PATENT DOCUMENTS

| | | | | |
|---|---|---|---|---|
| 4,794,598 A | * | 12/1988 | Desurvire et al. ............. 372/3 |
| 4,815,804 A | * | 3/1989 | Desurvire et al. ............. 385/27 |
| 4,971,417 A | * | 11/1990 | Krinsky et al. ............. 359/333 |
| 5,146,517 A | * | 9/1992 | Avramopoulos et al. ....... 385/39 |
| 5,917,979 A | * | 6/1999 | Prucnal ...................... 385/122 |
| 6,643,040 B2 | * | 11/2003 | Shen et al. ................. 359/107 |
| 2004/0037524 A1 | * | 2/2004 | Shahar et al. ............... 385/122 |

* cited by examiner

*Primary Examiner*—Brian M. Healy
(74) *Attorney, Agent, or Firm*—Eitan, Pearl, Latzer & Cohen Zedek LLP

(57) ABSTRACT

An optical threshold device including an input, an output, first and second radiation guiding branches, each branch having first and second terminals, at least one of the first and second branches having a non-linear optical element, first and second optical couplers, at least one of the first and second optical couplers having an asymmetric optical coupler, the first optical coupler configured to split an input signal of radiation from the input into a first radiation portion propagating through the first branch and a second radiation portion propagating through the second branch, the second optical coupler configured to combine the first and second radiation portions from the second terminals of the first and second branches, respectively, into an output signal at the output, wherein the non-linear optical element produces a phase shift between the first and second radiation portions and wherein the first and second radiation portions interfere at the second coupler in response to the phase shift.

28 Claims, 7 Drawing Sheets

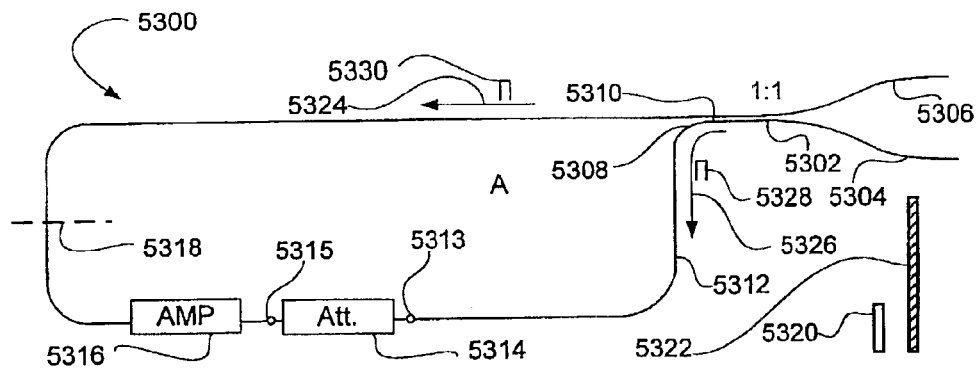
Fig. 4a
Fig. 4b
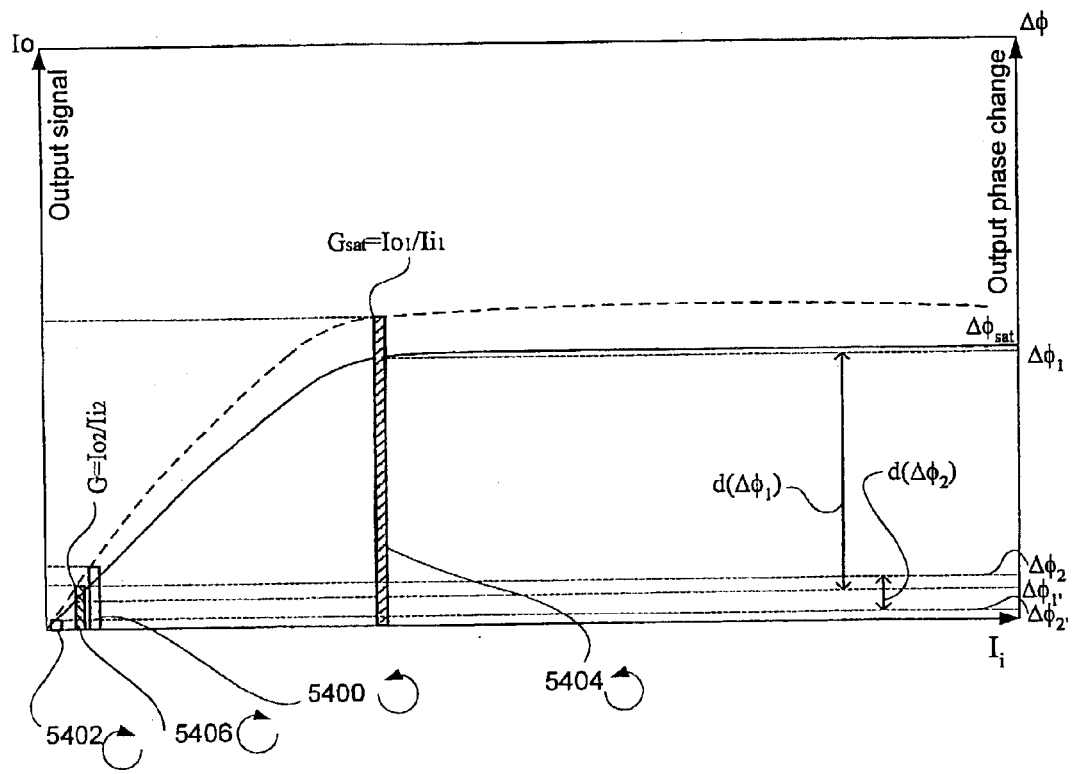
Fig. 5

OPTICAL THRESHOLD DEVICES AND METHODS

REFERENCE TO OTHER APPLICATIONS

This application claims the benefit of U.S. Provisional Patent Application Ser. No. 60/405,697, filed Aug. 22, 2002, entitled "Optical Switching Apparatus, System, and Method".

FIELD OF THE INVENTION

The invention relates to optical communication devices and systems and, more particularly, to optical threshold devices.

BACKGROUND OF THE INVENTION

In the field of optical communication, there is a need for fast threshold devices. Such devices may be used for enhancing Signal to Noise Radio (SNR), regenerating signals, discriminating between signals, and multiplexing/demultiplexing pulses of different magnitudes.

U.S. Pat. No. 5,917,979 ("the '979 patent") describes an optical threshold device having a non-linear loop mirror design including an ultra-fast Non Linear Element (NLE), such as a Solid-state (semiconductor) Optical Amplifier (SOA). The '979 patent demonstrates the potential efficiency of using a NLE, such as a SOA, as an ultra-fast device, which may be capable of producing desired phase shifts as a function of pulse intensity for interference purposes. However, the device described in the '979 patent suffers from various imperfections and limitations.

The device of the '979 patent relies on an asymmetric coupler as the input and output terminals to the loop mirror for producing pulses of different directions and intensities propagating along the loop. In the range of high input intensities, a relatively large ratio between the high and low peaks of the pulse intensity is essential for producing output signals, which may be modulated based on the different phase shifts produced for different intensities. To produce a high intensity ratio, the input coupler should be significantly asymmetric. However, an asymmetric coupler at the loop input cannot null the output signals for low intensity level input signals, e.g., for signals below a certain intensity threshold, by recombining the pulses returning to the coupler after completing their travel around the loop. Therefore, it is impossible to maintain a high amplitude ratio between the pulses that propagate along the loop, in different directions, while maintaining good threshold performances, e.g., zero output signals for the range of low input intensities. Accordingly, the design of the device of the '979 patent is based on a tradeoff, i.e., optimization, between a high amplitude ratio (i.e., a high splitting ratio of the coupler) and the ability to null the output signals for the range of low level input signals. This leads to a compromise between the performances of the threshold device in the ranges of low and high level signals at the device input.

In a variety of applications, threshold discrimination is used for discriminating only between two different intensity levels. Still, for such applications and others, it is important that the output of the threshold device would be substantially zero at low input intensities and non-zero, for high input intensities, e.g., intensities above a certain threshold level.

SUMMARY OF THE INVENTION

It is an object of embodiments of an aspect of the present invention to provide an improved optical threshold device. Exemplary embodiments of the invention may utilize principles of asymmetric nonlinear Mach Zehnder Interferometer (MZI) threshold devices, non-linear optical loop mirror threshold devices, and variations of asymmetric nonlinear MZI devices and optical loop mirror devices. The threshold devices in accordance with exemplary embodiments of the invention may produce output signal intensities approaching zero in response to low level input intensities and significantly non-zero output signals for higher input intensities.

In accordance with embodiments of an aspect of the invention, there is provided an optical threshold device including an input, an output, first and second radiation guiding branches, each branch having first and second terminals, at least one of the first and second branches having a non-linear optical element, first and second optical couplers, at least one of the first and second optical couplers having an asymmetric optical coupler, the first optical coupler configured to split an input signal of radiation from the input into a first radiation portion propagating through the first branch and a second radiation portion propagating through the second branch, the second optical coupler configured to combine the first and second radiation portions from the second terminals of the first and second branches, respectively, into an output signal at the output, wherein the non-linear optical element produces a phase shift between the first and second radiation portions and wherein the first and second radiation portions interfere at the second coupler in response to the phase shift.

In accordance with embodiments of another aspect of the invention, there is provided an optical threshold device including an input, an output, first and second radiation guiding branches, each branch having first and second terminals, at least one of the first and second branches having a non-linear optical element and at least one of the first and second branches having an optical attenuator, first and second optical couplers, the first optical coupler configured to split an input signal of radiation from the input into a first radiation portion propagating through the first branch and a second radiation portion propagating through the second branch, the second optical coupler configured to combine the first and second radiation portions from the second terminals of the first and second branches, respectively, into an output signal at the output, wherein the non-linear optical element produces a phase shift between the first and second radiation portions and wherein the first and second radiation portions interfere at the second coupler in response to the phase shift.

In accordance with embodiments of a further aspect of the invention, there is provided an optical threshold method including splitting an input signal of radiation into a first radiation portion and a second radiation portion, causing a phase shift between the first and second radiation portions, and producing an output signal by interfering the first and second radiation portions in response to the phase shift, wherein at least one of the splitting and the producing includes an asymmetrical effect.

BRIEF DESCRIPTION OF THE DRAWINGS

The present invention will be understood and appreciated more fully from the following detailed description of embodiments of the invention, taken in conjunction with the accompanying drawings in which:

FIG. 4a is a schematic illustration of a threshold device according to exemplary embodiments of another aspect of the present invention, including a nonlinear optical loop structure;

FIG. 4b is a schematic illustration of an exemplary attenuator design that may be used in conjunction with the threshold device of FIG. 4a;

FIG. 5 is a schematic illustration of a graph depicting relative phase shift and intensity of output signals produced by a NLE according to exemplary embodiments of the invention in response to input signals of two different amplitudes, showing two pulses propagating in opposite directions for each amplitude;

DETAILED DESCRIPTION OF EMBODIMENTS OF THE INVENTION

Figure 1A:
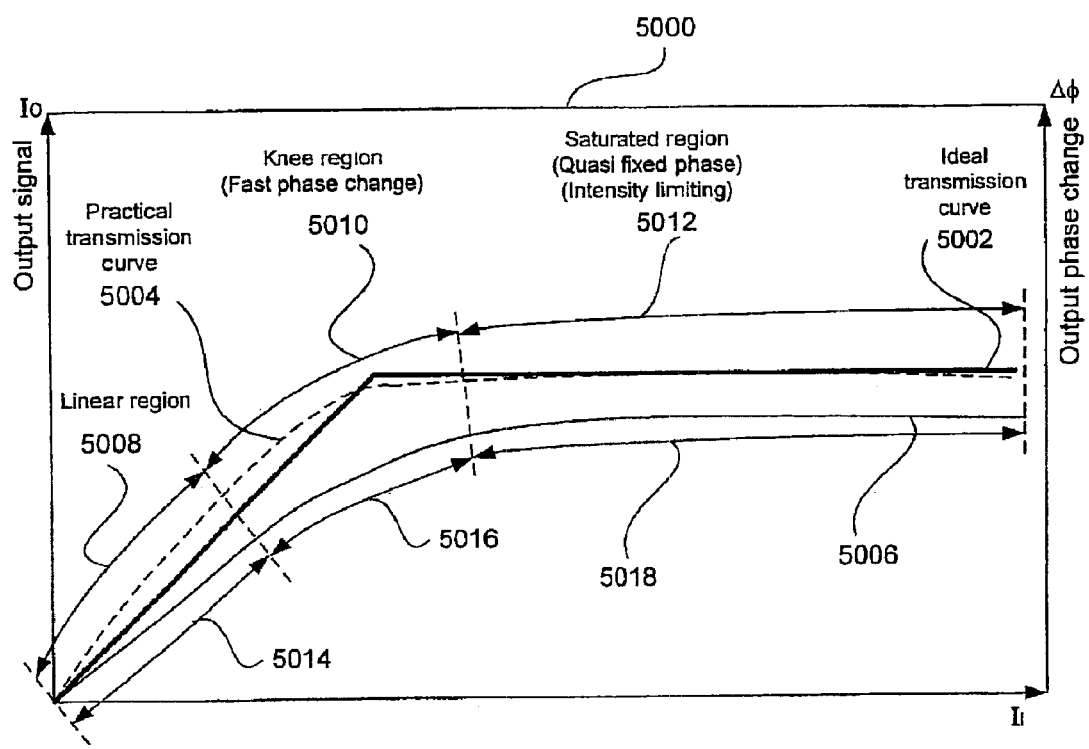
FIG. 1a is a schematic illustration of a graph showing relative phase shift and intensity of output signals of a Non Linear Element (NLE) as a function of signals input to the NLE.

FIG. 1a schematically illustrates a graph 5000 having coordinates of output intensity Io and output relative phase change $\Delta\phi$ versus input intensity Ii. Graph 5000 depicts ideal and practical transmission curves 5002 and 5004, respectively, illustrating the relationship between output and input intensities, Io and Ii, respectively, of a nonlinear medium, e.g., a Non-Linear Element (NLE) such as, for example, an optical amplifier, an Erbium Doped Fiber Optic Amplifier (EDFA), a Solid state Optical Amplifier (SOA), a Linear Optical amplifier (LOA), an optical limiter, or any other suitable nonlinear device or material. Curve 5006 schematically illustrates the relationship between the output phase change $\Delta\phi$ and the input intensity Ii in optical devices such as, for example, the above-mentioned amplifiers, limiters, or nonlinear media As shown in FIG. 1a, curve 5004 has a linear region 5008, a nonlinear knee region 5010, and a quasi-flat saturation region 5012. For relatively low level input signals Ii, in range 5008, the corresponding output signals Io are substantially linearly proportional to the input signal Ii. For intermediate levels of input signals Ii, e.g., in range 5010, the output signals Io are no longer linearly proportional to the input signals. For relatively high-level input signals Ii, e.g., in the range 5012, the output signals Io are saturated, generally fixed, and independent of the intensity of the input signals Ii.

Curve 5006 shows a phase change $\Delta\phi$, which may correspond to a change of the refractive index $\Delta N$, at the output of the non-linear device. The phase change $\Delta\phi$ depends on the change of the refractive index $\Delta N$, the wavelength $\lambda$, and the length of the amplifier/limiter L. The phase change may be given by:

$$\Delta\phi = 2\pi/\lambda \Delta NL \quad (1)$$

Thus, for fixed values of wavelength $\lambda$ and length L, the phase change $\Delta\phi$ may be linearly proportional to the change of the refractive index $\Delta N$.

At the range of low-level input signals, the output phase change $\Delta\phi$ depends linearly on the input signals Ii as indicated by range 5014, which corresponds to intensity range 5008. At the range of medium level input signals, the change of $\Delta\phi$ is a sub-linear function of the input intensities Ii, as indicated by range 5016 which corresponds to intensity range 5010. At the range of relatively high input signals, the output phase shift $\Delta\phi$ is saturated and is almost fixed and does not depends on the input intensities Ii, as indicated by range 5018, which corresponds to intensity range 5012.

Figure 1B:
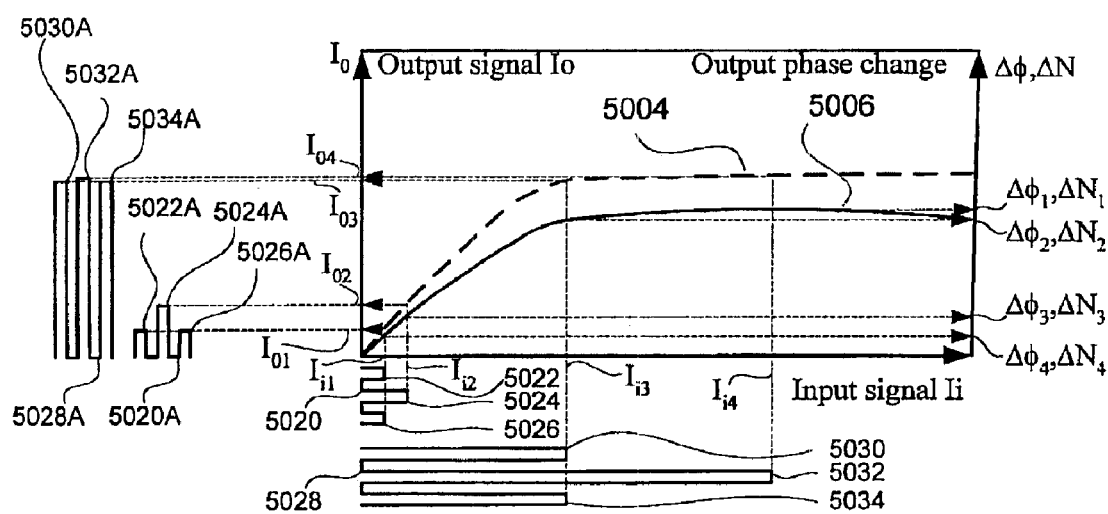
FIGS. 1b and 1c are schematic illustrations of relative phase shifts and output signal intensities as in the graph of FIG. 1a, as applied to different input pulse patterns.

FIG. 1b schematically re-illustrates transmission curve 5004 of FIG. 1a, where with exemplary output signals Io versus input signals Ii are indicated, as well as curve 5006 of FIG. 1a, where exemplary output phase changes $\Delta\phi$ versus inputs signals Ii are indicated. FIG. 1b further illustrates the relationship between exemplary input signal patterns, 5020 and 5028, and their corresponding output signal patterns, 5020A and 5028A. In analyzing FIG. 1b and FIG. 1c for two different types of input signals, namely, low-level input signals within the linear range of the NLE (e.g., ranges 5008 and 5014 of FIG. 1a) and high-level input signals within the saturation range of the NLE (e.g., ranges 5012 and 5018 of FIG. 1a), the following observations are made:

Input signal pattern 5020 is a low level input signal and the pulses of signal 5020 (i.e., pulses 5022 and 5026 and pulse 5024), having intensities $Ii_1$ and $Ii_2$, respectively, are within range 5008 (or 5014) of FIG. 1a. Thus pulses 5022, 5024 and 5026 are transmitted linearly according to curve 5004, resulting in output signal pattern 5020A having intensifies $Io_1$ and $Io_2$, respectively. The pulses of signal 5020A (i.e., pulses 5022A, 5024A and 5026A) are also within the linear range 5014 (or 5008) of FIG. 1a and are, thus, transmitted linearly according to curve 5006. As shown in FIG. 1b, the lower amplitude pulses 5022A and 5026A have a phase shift $\Delta\phi_1$ and the higher amplitude pulse 5024A has a phase shift of $\Delta\phi_2$. Since the pulses 5022A, 5024A and 5026A are all with low amplitudes, the phase shifts $\Delta\phi_1$ and $\Delta\phi_2$ are both very small. The difference $\Delta\phi_1-\Delta\phi_2$ is even smaller and may be ignored for the purpose of the present invention. Accordingly, for the purpose of the present invention, the pulses 5022A, 5024A and 5026A of pattern 5020A may be considered to have substantially the same phase shift $\Delta\phi$.

Input signal pattern 5028 represents an intensity amplification of signal pattern 5020. The pulses of signal 5028 (i.e., pulses 5030 and 5034 and pulse 5032), have intensities $Ii_3$ and $Ii_4$, respectively, and are within the high level, i.e., saturated, intensity range 5012 (or 5018) of FIG. 1a. Thus, pulses 5030, 5032 and 5034 are transmitted according to curve 5004 with quasi-equal intensities $Io_3$ and $Io_4$, and quasi-equal phase shifts $\Delta\phi 3$ and $\Delta\phi_4$, resulting in output pulses 5030A, 5032A and 5034A, respectively, of output signal pattern 5028A.

Figure 1C:
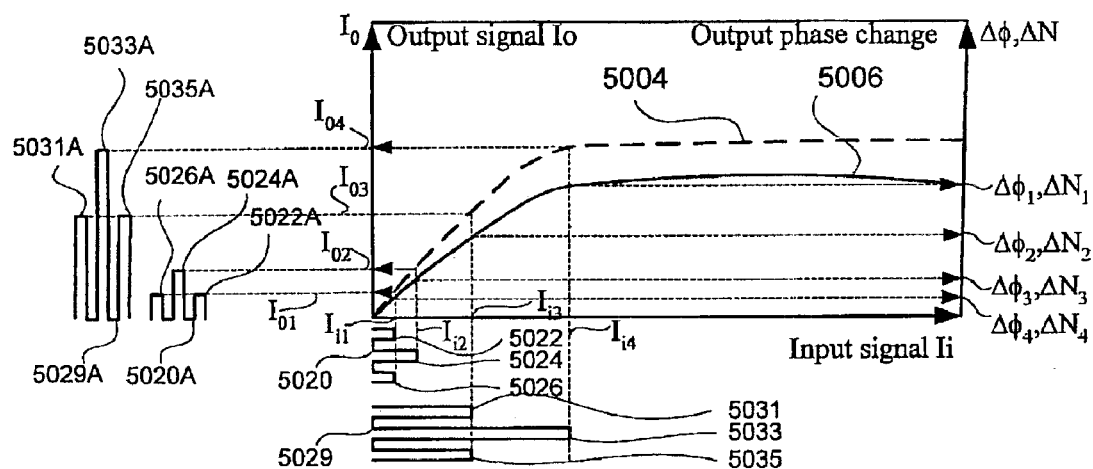

FIG. 1c schematically illustrates a graph similar to that of FIG. 1b, showing the same input and output patterns 5020 and 5020A; however, instead of amplified pattern 5028, FIG. 1c illustrates transmission of an input pattern 5029, which is produced by a lower amplification of input pattern 5020 than that of pattern 5028. Due to the lower amplification of pulse pattern 5020, only the higher amplitude 5033 of pattern 5029 has an intensity $Ii_4$ in the saturated region 5012 (or 5018) of FIG. 1a. However, the intensity $Ii_3$ of the other amplitudes, namely, the intensity of amplitudes 5031 and 5035, is within the linear region 5008 (or 5014) of FIG. 1a. Accordingly, the non-linear device applies a lower effective amplification factor to amplitude 5033 compared to the amplification factor applied to amplitudes 5031 and 5035, and results is larger phase difference, $\Delta\phi_4 - \Delta\phi_3$, between the output pulse 5033A and output pulses 5031A and 5035A of output pattern 5029A, respectively.

Figure 2A:
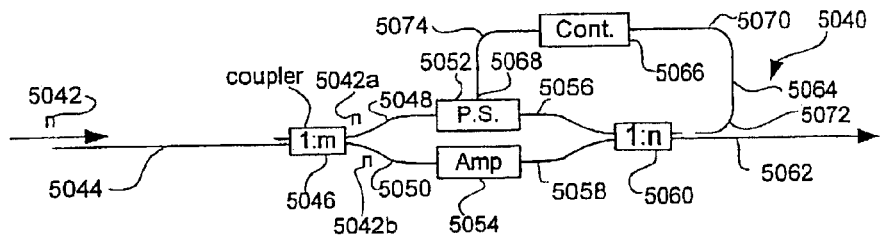
FIGS. 2a–2d are schematic illustrations of four, respective, exemplary designs of threshold devices according to exemplary embodiments of one aspect of the present invention, using an adaptation of a non-linear MZI.

FIG. 2a schematically illustrates a threshold device 5040 according to exemplary embodiments of one aspect of the present invention. The device illustrated in FIG. 2a may include a continuous sequence of optical components connected by light guiding media such as, for example, optical fibers, planar waveguides, or planar circuits (PLC) that may be fabricated using integrated optic techniques and/or on-chip manufacturing. Alternatively, device 5040 may be constructed from discrete components, in which case the optical fibers may be replaced by open space and the directional couplers, discussed below, may be replaced by beam splitters. A low level input pulse 5042 may propagate through input terminal 5044 of an asymmetric directional coupler 5046 having an amplitude splitting ratio of 1:m, wherein m may be any positive number). Coupler 5046 may split pulse 5042 into two pulses, 5042a and 5042b, which may propagating in separate output branches, 5048 and 5050, respectively. The normalized amplitudes of pulses 5042a and 5042b in branches 5048 and 5050 are thus m and 1, respectively, in relative units as defined herein. Pulse 5042a may propagate through phase shifter 5052 and may enter a directional coupler 5060 via an input branch 5056. Pulse 5042b may propagate through amplifier 5054 and may enter coupler 5060 via an input branch 5058. Phase shifter 5052 may be adjusted to produce a phase shift $\Delta\phi$ to ensure that pulse 5042a destructively interferes with pulse 5042b at an output port 5062 of coupler 5060. The amplitude gain G of amplifier 5054 may be adjusted to maintain an amplitude magnitude of pulse 5042b, at input branch 5058 of coupler 5060, that will cause pulses 5042a and 5042b to null each other by the destructive interference between them at output port 5062 of coupler 5060.

The phase shift $\Delta\phi$ produced by phase shifter 5052 may ensure that pulses 5042a and 5042b enter coupler 5060 with a phase difference of $\pi/2$ radians. This means that $\Delta\phi$ may compensate for the differences in optical paths caused by the differences between branches 5048 and 5050, the terminals of coupler 5046 and 5060, and the phase shift of amplifier 5054, which may include a SOA, LOA, or EDFA, as are known in the art, such that the relative phase between pulses 5042a and 5042b at output port 5062 of coupler 5060 will be $\pi$ radians. At the same time, input ports 5058 and 5056 of combiner 5060 contribute their amplitudes to output port 5062 in a ratio of 1:n, wherein n represents any positive number, respectively, to produce equal amplitude pulses with opposite phases. When the required conditions for $\Delta\phi$ and the amplitudes are maintained, the amplitude at port 5062 may be given by:

$$I_{5062} = 1 \times G - m \times n = 0 \quad (2)$$

To assure that $I_{5062}$ will be zero, the amplification G of amplifier 5054 should be equal to m×n when n is the splitting/combining ratio of coupler 5060. Accordingly, in embodiments of the invention, both couplers 5046 and 5060 may be asymmetric couplers, wherein m, n≠1 and m×n=G).

Alternatively, one of couplers 5060 and 5046 may be an asymmetric coupler while the other coupler may be a symmetric coupler, wherein either n=1 and m≠1 or m=1 and n≠1 and m×n=G. For example, when coupler 5060 is a symmetric coupler (i.e., n=1), gain G may be equal to m.

To compensate for possible changes in the relative phases of pulses 5042a and 5042b in coupler 5060 due to influence by external parameters, for example, environmental temperature changes, the relative phase may be controlled by a closed loop 5070 that may control phase shifter 5052 to maintain the proper phase shift $\Delta\phi$. A coupler 5072 may tap a fraction of the intensity from port 5062 into optical guide 5064, which may transmit the tapped light to a controller 5066, which may monitor the tapped light and produce a corresponding electronic control signal that may be sent via lead 5074 to electrode 5068. The electronic control signal may be used as feedback for adjusting phase shifter 5052. For the range of low-level input signal 5042, the output signal at port 5062 should be substantially zero. A substantially zero-level output may be maintained by closed loop control 5070 by adjusting shifter 5052 using controller 5066.

In embodiments of the invention, closed loop 5070 maintains the desired steady state phase relationship between the signals at ports 5056 and 5058, respectively. The response time of closed-loop phase control 5070 may be considerably longer than the time duration of the signals propagating in device 5040 and thus, the dynamic influence of loop 5070 on the phases of these signals may be negligible. To maintain the above mentioned steady-state conditions by sampling short-duration optical signals, controller 5066 may monitor and average the tapped light, e.g., by integration over a predefined range, producing an electronic control signal corresponding to the average of the optical signals, as tapped, arriving at optical guide 5064 from coupler 5072.

In the range of low-level input signals, the change of the phases produced by amplifier 5054 is small and there is no change in the amplifier gain G. This means that while gain G and phase shift $\Delta\phi$ of threshold device 5046 may be adjusted to produce a zero-level output signal for inputs at a certain low level amplitude, the amplifier actually maintains an output signal level of substantially zero in a range of low-level input intensities that includes the specific intensity for which device 5040 is adjusted to produce the zero-level signal. The range of low-level input intensities may be defined as the range of amplitudes below a certain amplitude level for which the threshold device may be designed to yield substantially zero-level output signals.

The magnitude of the amplitude for which the threshold device is designed to yield a zero-level output may be determined by the values of gain G and phase shift $\Delta\phi$. For amplitudes significantly higher than the above discussed low-level inputs, as discussed below with reference to FIG. 2b, gain G may be reduced to a saturated value $G_{sat}$ and the phase shift $\Delta\phi$ may be increased to a saturated value $\Delta\phi_{sat}$, i.e., the requirement for Equation 2 above are not fired. Instead, in the range of high-level input signal, device 5040 may transmit the signals at a non-zero output level, which may be given by:

$$I_{5062} = 1 \times G - m \times n \neq 0 \quad (3)$$

Thus, the gain G and the phase shift $\Delta\phi$ may control the "turn on" point of the threshold device. The "turn on" (e.g., threshold) point may be defined as a point on the axis of input amplitudes (intensities) at which the transmission function of the threshold device, i.e., the output signal as a function of the input signal, begins to increase sharply.

Figure 2B:
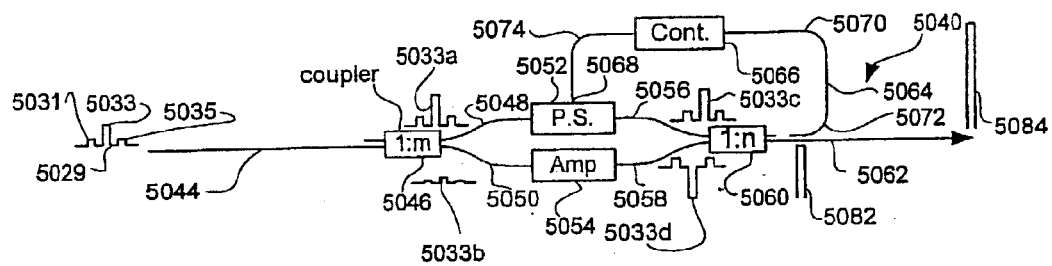

FIG. 2b illustrates threshold device 5040, as in FIG. 2a, but describes operation of device 5040 for both low and high level ranges of input signals that may be carried by input pulse pattern 5029. The input pattern signal 5029 may be as illustrated in FIG. 1c, i.e., it may include lower level pulses 5031 and 5035 with magnitudes within the linear range of amplifier 5054 and a higher-level pulse 5033 with a magnitude in the saturation range of amplifier 5054. Lower level pulses 5031 and 5035 of input pattern 5029 may have amplitudes substantially the same or similar to the amplitude of pulse 5042 in FIG. 2a, Accordingly, as explained above with reference to pulse 5042 of FIG. 2a, there would be substantially no output signal at port 5062 of device 5040 in response to input pulses 5031 and 5035. It will be appreciated that the above discussion relating to lower level input pulse 5042 is also applicable to lower level input pulses 5031 and 5035 in FIG. 2b.

In contrast to the low-level pulses, pulse 5033 may be split by coupler 5046 into two pulses, 5033a and 5033b, propagating along branches 5048 and 5050, respectively. The amplitude of pulse 5033a may be about m times higher than the amplitude of pulse 5033b; however, the amplitude of pulse 5033b is still in the saturation range of amplifier 5054. As explained above, in the saturation range, the gain $G_{sat}$ of amplifier 5054 may be much lower than gain G in the linear region. This means that, in the range of high-level input signals, the ratio between the amplitudes of pulses 5033d and 5033c, carried by input branches 5058 and 5056 of coupler 5060, respectively, may be much smaller than the ratio between these pulses in the range of low-level input signals. Accordingly, in contrast to the ratio maintained between pulses 5033d and 5033c to substantially null the output signal at port 5062 for the low-level input signals, the ratio between pulses 5033d and 5033c for the high-level input signals may be changed to a value which results in a significantly non-zero output signal at port 5062. In addition, the phase shift produced by amplifier 5054 in the saturated region may be much higher than the phase shift produced by the amplifier in the linear region. It can be seen from Equation 1 that the phase difference between pulses 5033c and 5033d at inputs 5056 and 5058 of coupler 5060, respectively, may be reversed, e.g., from the value of $\pi/2$ radians for low-level signals to a value of $-\pi/2$ radians for the high-level signals, by appropriate selection of the length L of amplifier 5054. The phase difference between pulses 5033c and 5033d at inputs 5056 and 5058 of coupler 5060 may also be adjusted by adjusting the excitation level of amplifier 5054, which may determine the saturation level of the amplifier. Changing the polarity of the relative phase shift between pulses 5033c and 5033d, from a positive value at low-level signals to a negative value at high-level signals, results in a change from destructive interference to constructive interference, respectively, between pulses 5033c and 5033d at port 5062. This means that for low-level input signals, the output signals at port 5062 may "cancel out" by destructive interference, while the high-level input signals may interfere constructively to produce non-zero output signals at port 5062. Therefore, in this case, the phase difference between the pulses at the input terminals of coupler 5060 may be opposite the phase difference between the same terminals in the case of lower level input amplitudes (e.g., pulse 5042 of FIG. 2a or pulses 5031 and 5035 of FIG. 2b).

It should be note that, even if the phase difference between pulses 5033c and 5033d is not reversed, the output signal at output port 5062, i.e., the expression $I_{5062}=1 \times G_{sat} - m \times n$, may not be zero because $G_{sat}$ may not be equal to m×n. In addition, the phase difference between pulses 5033c and 5033d may be reversed, e.g., pulse 5033d may be drawn "upside down" relative to pulse 5033c, to indicate a reverse phase polarity, as schematically illustrated in FIG. 2b. Thus, for high-level input signals, the intensity at output port 5062 may be produced by constructive interference, rather than by destructive interference, when operating on low amplitude level signals. Accordingly, in the case of relatively high level input signals, an output signal 5082 at output port 5060 may be significantly different from zero and may be given by: $I_{5062}=1 \times G_{sat}+m \times n \neq 0$, where $G_{sat}$ is the amplitude gain at the saturated region of amplifier 5054.

In embodiments of the invention, output signal 5082 may be further amplified to any desired intensity to produce a stronger signal, represented by pulse 5084.

Figure 2C:
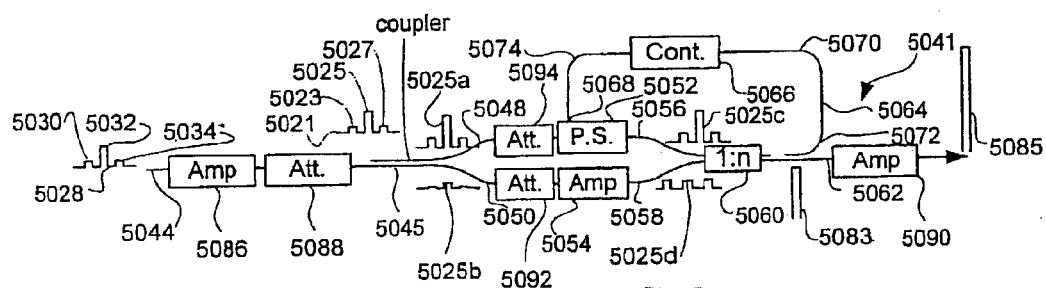

FIG. 2c illustrates a threshold device 5041, which is an exemplary variation of the threshold device 5040 illustrated in FIGS. 2a and 2b. In this variation, the 1:m directional coupler 5046 of FIGS. 2a and 2b is replaced with a symmetric directional coupler 5045 and the 1:m ratio between the amplitudes at branches 5050 and 5048, respectively, may be obtained by appropriately different attenuation of the two branches, e.g., using different attenuators 5092 and 5094, respectively.

Device 5040 of FIGS. 2a and 2b and device 5041 of FIG. 2c are described in accordance with two different operational design requirements. It should be appreciated, however, that appropriate adjustment of parameter settings in device 5041 may produce the threshold operation described above with reference to device 5040, and vice versa, as well as other threshold operations not explicitly described herein.

In device 5040 of FIGS. 2a and 2b, the output signals for higher level input signals are controlled by the gain and phase changes produced by amplifier 5054 when it is operated in the saturated region. In device 5041 of FIG. 2c, in contrast, the signals for the higher-level input signals may be controlled only by the change in the gain of amplifier 5054 when it is operated in its a deeply saturated range.

The input pulse pattern in the embodiment of FIG. 2c maybe of a type such as pattern 5028 of FIG. 1b, i.e., of the type in which both the lower level input pulses 5030 and 5034 and the higher level input pulse 5032 are in the saturated range of amplifier 5054. To produce such an input, an amplifier 5086 may be used in conjunction with a variable attenuator 5088 to produce an amplifier with variable gain, whereby the input gain may be adjusted to convert pattern 5028 into the type of pattern 5021, which includes low-level pulses 5023 and 5027 and high amplitude pulse 5025. After amplification and attenuation (hereinafter: "net amplification") of input pattern 5028 into pattern 5021, if such amplification is needed, pattern 5021 may be split by coupler 5045 into pulses 5025a and 5025b, propagating in branches 5048 and 5050, respectively. In embodiments of the invention, the relative attenuations of attenuators 5092 and 5094 may be set to produce an amplitude ratio of 1:m between the signals at branches 5050 and 5048, respectively. The pulse pattern at branch 5050 may pass through amplifier 5054 when the lower level pulses have amplitudes within the saturation region of amplifier 5054. Thus, the pulse pattern may arrive at input 5058 of coupler 5060 with a gain of G' and with, e.g., the maximum possible phase shift that amplifier 5054 can produce. The pulse pattern at branch 5048 passes through phase shifter 5052 and may arrive at input 5056 of coupler 5060 with a phase shift as produced by phase shifter 5052, which may be adjusted to produce appropriately destructive interference between interfering pulses from inputs 5056 and 5058 at output 5062. In addition, the ratio of 1:m may be adjusted such that m may be equal to G'/n. Accordingly, the output signal for lower-level input signals of device 5041 may be given by: $I_{5062}$=1×G'−m×n=0, where n is the splitting ratio of coupler 5060. For example, if coupler 5060 is a symmetric coupler (n=1), then G' may be equal to m.

With higher-level input signals, such as pulse 5032 of pattern 5028, the operation of device 5041 may be generally similar to its operation with lower-level input signals, except for a different gain of amplifier 5054. Since higher-level pulse 5025*b* is significantly within the saturated region, the gain of amplifier 5054 for this signal, G", may be different from gain G'. However, the phase shift produced by amplifier 5054 for pulse 5025*b* may be the same as the phase shift produced for the lower level pulses, and may be the maximum possible phase shift. Accordingly, high-level pulses 5025*d* and 5025*c* from inputs 5058 and 5056, respectively, may interfere destructively at output port 5062 as in the case described above of low-level pulses. However, in the case of high-level pulses, in accordance with embodiments of the invention, pulse 5025*d* may be amplified by amplitude gain G", which may be significantly lower than G', whereby output signal 5082 may be significantly different from zero and may be given by:

$$I_{5062}=1\times G''-m\times n=G''-G'\neq 0.$$

Since, for higher-level input signals, device 5041 does not rely on phase inversion to produce an output signal 5083, in such a situation, the amplitude of the output signal may be smaller than the amplitude of output signal 5082 discussed above with reference to FIG. 2*b*. Accordingly, amplifier 5090 may be used to enhance pulse 5083 and, thereby, to produce a higher amplitude signal 5085.

In analogy to the control of the "turn on" point discussed above with reference to device 5040, the "turn on" point of device 5041 may also be adjusted by varying the values of the amplifier length L, the splitting ratios m and n and the saturated level of amplifier 5054, and/or by adjusting gains G' and G". The saturation level of amplifier 5054 may be varied by changing the excitation level of the amplifier, e.g., by adjusting optical pumping power in the case of EDFA and LOA, or by adjusting current injection level in the case of SOA. Accordingly, by adjusting the above mentioned parameters, e.g., the values of m, n, G', G", and the excitation level, it is possible to determine the amplitude for which the following equations are filled:

$$I_{5062}=1\times G'-m\times n=0 \text{ and } I_{5062}=1\times G''-m\times n=G''-G'\neq 0 \qquad (4)$$

The amplitude deduced from the value of G' in Equations 4 may be defined as the "turn on" point of device 5041.

Figure 2D:
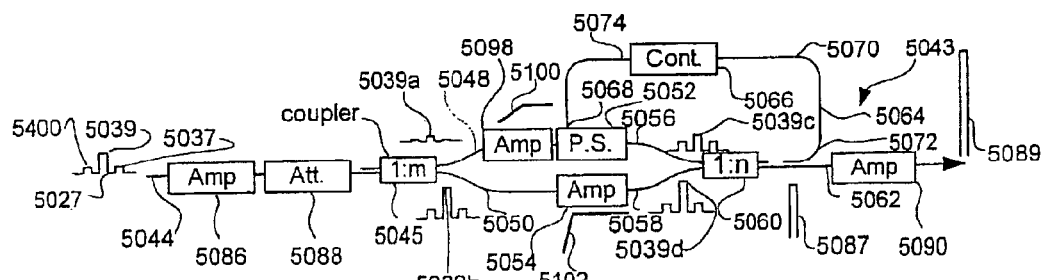
Figure 3A:
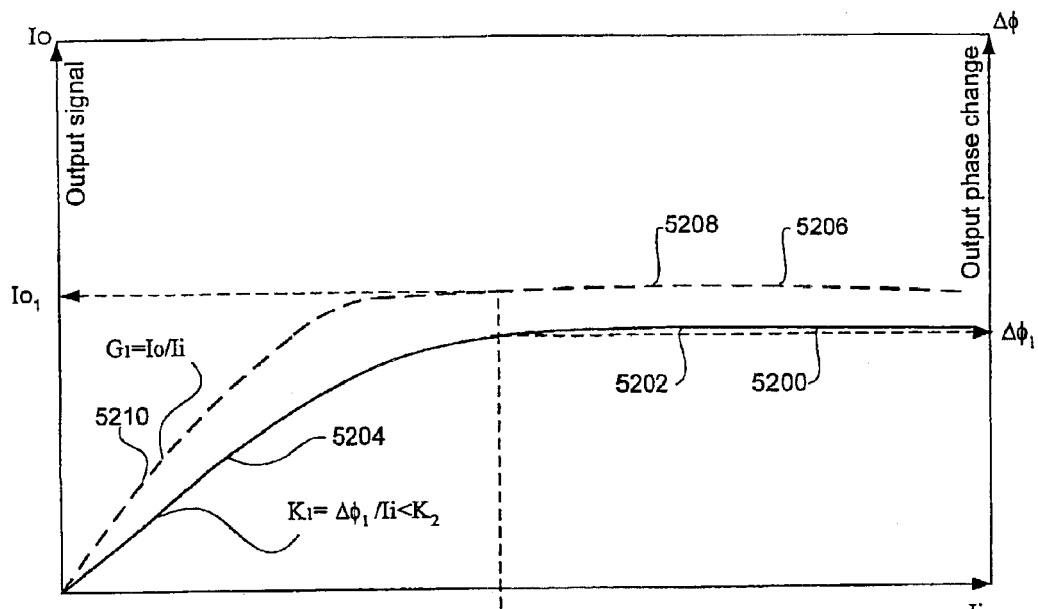
FIGS. 3a and 3b are schematic illustrations of the transmission functions of output intensities and phase shifts versus input intensities for an optical amplifier according to exemplary embodiments of the present invention at different excitation levels.
Figure 3B:
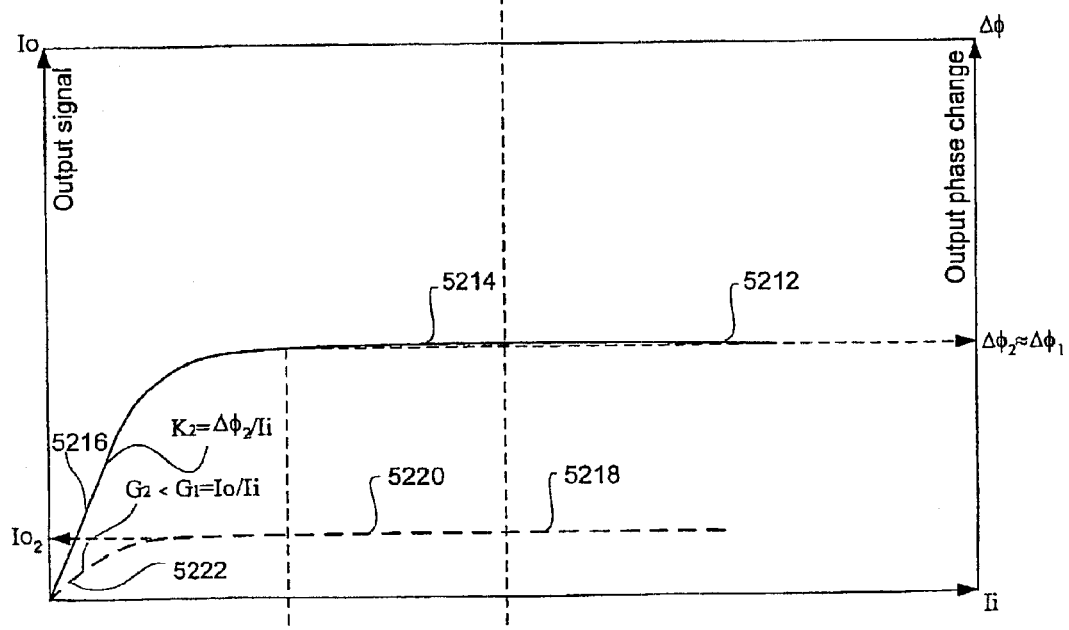

Reference is now made to FIGS. 2*d*, 3*a*, and 3*b*. FIG. 2*d* illustrates threshold device 5043 in accordance with further exemplary embodiments of the present invention. FIGS. 3*a* and 3*b* illustrate the amplitude and phase transmission functions of a NLE (e.g., SOA, LOA, or EDFA) of device 5043 for two, respective, excitations levels. The threshold device 5043 in accordance with the embodiment of FIG. 2*d* may have a structural design generally similar to the structural design of device 5041 of FIG. 2*c*, with the following differences. In the component structure of the device, attenuator 5092 of FIG. 2*c* is removed and attenuator 5094 of FIG. 2*c* is replaced by an amplifier 5098. Additionally, device 5043 may be designed to operate in accordance with two different modes as detailed below.

In the first mode of operation of device 5043, couplers 5045 and 5060 may be symmetric couplers (e.g., m=1, n=1). Amplifiers 5054 and 5098 may be generally identical; however, the excitation level (e.g., optical pumping or current injection level) of amplifier 5098 may be lower than the excitation level of amplifier 5054. Thus amplifier 5098 may have a lower saturation level. The transmission functions and the saturation levels of amplifiers 5098 and 5054 are depicted denoted by symbols 5100 and 5102, respectively. Lower input pulses, 5400 and 5037 and high-level pulse 5039 of input signal pattern 5027 may be amplified and attenuated by amplifier 5086 and attenuator 5088, respectively, to produce a variable input gain, if necessary. Lower input pulses 5400 and 5037, which may be split by splitter 5045 into branches 5048 and 5050, may be amplified and their phase may be shifted by amplifiers 5098 and 5054. Phase shifter 5052 may control the phase of pulses within the range of lower level amplitudes such that the pulses enter port 5056 in a phase that ensures a desired destructive interference at port 5062. In this design, lower-level pulses substantially cancel each other out at output port 5062, resulting in a zero-level output signal from coupler 5060.

Higher-level input pulse 5039 may also be split by splitter 5045 into pulses 5039*a* and 5039*b*, propagating along branches 5048 and 5050, respectively. Pulse 5039*b* may be amplified by amplifier 5054 to produce pulse 5039*d*. Pulse 5039*a* may be amplified by amplifier 5098, which may have a saturation level lower than the saturation level of amplifier 5054 and, thus, may already be saturated at the amplitude magnitude of pulse 5039*a*. Accordingly, the amplitude of pulse 5039*c* that is produced by amplifier 5098 is smaller than the amplitude of pulse 5039*d* produced by amplifier 5054. The difference between the amplitudes of pulses 5039*d* and 5039*c* is enough to produce a significantly non-zero output signal at port 5062. In addition, the phase shift of pulse 5039*c*, which may be in the saturated region of amplifier 5098, may be greater than the phase shift of pulse 5039*d*, which may be in the linear region of amplifier 5054. In this scenario, the different shifts of the phases of pulses 5039*c* and 5039*d* further enhance output signal 5087, for higher level input signal, because the interference at port 5062 may not be perfectly destructive. Amplifier 5090 may be used to enhance pulse 5087 and, thereby, to produce a higher amplitude signal 5089.

FIGS. 3*a* and 3*b* illustrate transmission functions of output intensity, Io, and output phase shift, Δϕ, versus input intensity, Ii, corresponding to amplifiers 5054 and 5098, respectively. Solid line 5200 in FIG. 3*a*, which corresponds to amplifier 5054, illustrates the output phase shift Δϕ versus the input intensity Ii with saturated and linear regions, 5202 and 5204, respectively. Broken line 5206 in FIG. 3*a* illustrates the output intensity Io versus the input intensity Ii of amplifier 5054 with saturated and linear regions, 5208 and 5210, respectively. Similarly, solid line 5212 in FIG. 3*b*, which corresponds to amplifier 5098, illustrates the output phase shift Δϕ versus the input intensity Ii with saturated and linear regions, 5214 and 5216, respectively. Broken line 5218 of FIG. 3*b* illustrates the output intensity Io versus the input intensity Ii of amplifier 5098 with saturated and linear regions, 5220 and 5222, respectively.

It can be seen that amplifier 5054 with the higher excitation has a gain slope $G_1$ that is steeper than the gain slope $G_2$ of amplifier 5098 with the lower excitation. On the other hand, the slope of the phase shift, $K_1$, in amplifier 5054 is less steep than the slope of the phase shift, $K_2$, in amplifier 5098. This means that even if amplifiers 5054 and 5098 are designed to be identical, the different excitation levels of the two amplifiers result in different gains and different phase shifts for the two amplifiers. Accordingly, device 5043 may operate in a mode that produces an output signal in response to higher-level input signals, when amplifier 5098 is saturated and amplifier 5054 is not saturated, resulting in the two amplifiers having different gains and phase shifts. When device 5043 receives at its input 5044 signals in the range of lower level amplitudes, the resultant signals at branches 5056 and 5058 may cancel each other out at output port 5062. However, since amplifiers 5054 and 5098 have different gain slopes, $G_1$ and $G_2$, respectively, and different phase shift slopes, $K_1$ and $K_2$, respectively, the resultant signals at terminals 5056 and 5058 have different gains and phase shifts, as explained above, even in the range of lower level input signals. Accordingly, while in the lower range amplifiers 5054 and 5098 compensate for each other's results, their mutual compensation may not be accurate and the signals of branches 5056 and 5058 may not completely cancel each other out at port 5062 to produce zero-level (or close to zero-level) signals across the range of lower level input signals.

An improvement to the performance of device 5043, in a second mode of operation, may-be achieved by using asymmetric couplers 5045 and 5060 to produce substantially zero-level output signals across the range of lower-level inputs. In the second mode of operation of device 5043 of FIG. 2d, asymmetric couplers may be used for couplers 5045 and 5060 instead of the symmetric couplers used in the first mode of operation of the design of device 5043 in FIG. 2c s above.

Coupler 5045 may receive input signals from terminal 5044 and may split them at a ratio of 1:m, where the larger split portion (m) is directed toward branch 5050, which leads to amplifier 5054 with the less steep phase shift slope $K_1$, and the smaller split portion (1) is directed toward branch 5048, which leads to amplifier 5098 with the steeper phase shift slope $K_2$. The ratio 1:m may be chosen to be similar to the ratio $K_1$:$K_2$. Thus, the product $1 \cdot K_2 = m \cdot K_1$, may be fulfilled, thereby assuring that substantially the same phase shift would be produced by both of amplifiers 5054 and 5098 across the range of lower level input signals, at least over the amplitude range in which amplifier 5098 is substantially linear.

Since, under the above conditions, amplifiers 5054 and 5098 produce substantially the same phase shift across the range of lower level input signals, phase shifter 5052 may be adjusted to maintain the relative phase shift between the pulses at branches 5056 and 5058 such that the pulses from the two branches may interfere destructively at output port 5062. However, maintaining the same phase shift for both amplifiers 5054 and 5098 requires that the smaller split amplitudes (fraction 1 from coupler 5045) be directed towards amplifier 5098 via branch 5048 with the lower amplitude gain $G_2$. At the same time, the larger split amplitudes (fraction m from coupler 5045) are directed toward amplifier 5054 via branch 5050 with the higher amplitude gain $G_1$. This means that the amplitudes with the smaller fraction (1) at terminal 5056 may be amplified by the smaller gain $G_2$, resulting in significantly smaller amplitudes than the amplitudes at terminal 5058 that are produced from the larger split fraction (m) amplified by the larger gain $G_1$.

To ensure that the amplitudes from terminals 5056 and 5058 are recombined with substantially equal amplitudes at output port 5062, combiner (directional coupler) 5060 may be asymmetric with a combining ratio of 1:n, where the larger n portion arrives at port 5062 via branch 5056 and the smaller 1 portion arrives to that port via branch 5058. In the range of low level input signals, the amplitude at port 5062 should be substantially zero and may be given by:

$$I_{5062} = 1 \cdot G_2 \cdot n - m \cdot G_1 \cdot 1 = 0 \quad (5)$$

which may be reduced to: $G_2 \cdot n = m \cdot G_1$

For higher-level input signals, such as pulse 5039, amplifier 5098 may be saturated, its gain is reduced, and its phase shift is no longer equal to the phase shift of amplifier 5054. This results in a significantly non-zero output signal 5087 at output port 5062 because the interference in port 5062 in this scenario is not completely destructive and the condition that $G_2 \cdot n = m \cdot G_1$, derived from Equation 5, is no longer fulfilled.

From the above discussion, it is clear that the second design (mode) of device 5043, using asymmetric couplers 5045 and 5060, may be advantageous over the design using symmetric couplers because asymmetric design is clearly capable of maintaining the output signal 5087 at port 5062 at an amplitude of substantially zero across the entire range of lower level input signals.

In devices 5040, 5041, and 5043 of FIGS. 2a–2d, the "turn on" point in both the symmetric coupler design and the asymmetric coupler design, may be adjusted by adjusting the saturation level of amplifiers 5098 and 5045, e.g., by optical pumping or current injection The excitation levels of amplifiers 5089 and 5045 may be different. Additional adjustable parameters that may determine the "turn on" point include gain G and the length L of amplifiers 5054 and 5098, the splitting ratios m and n of couplers 5045 and 5060, and the attenuation level of attenuators 5088, 5094 and 5092, which attenuation level may be different for each attenuator.

The "turn on" point of devices 5040, 5041 and 5043 may actually be a threshold level. For low-level input signals, e.g., in the range below the "turn on" threshold, the output signal may be strongly attenuated by destructive interference at the output ports of the devices. This may result in a transmission function between the input and the output of the devices including a generally monotonic range with a relatively shallow slope. For high-level input signals, e.g., in a range above the "turn on" threshold, the output signal at the output port of the devices may increase sharply, whereby the transmission function between the input and the output of these devices may include a range with a steep slope.

In some embodiments of the invention, the amplitude at branch 5050 may be attenuated by a factor of 1/n prior to entering branch 5058. In such embodiments, a symmetric (i.e., 1:1) coupler may be used instead of asymmetric (1:n) coupler 5060. Similarly, in some embodiments of the invention, asymmetric coupler 5045 (1:m) may be replaced by a symmetric coupler with additional attenuators, in analogy to the configuration of device 5041 in FIG. 2c where symmetric coupler 5045 is used in conjunction with attenuators 5092 and 5094.

In analogy to device 5040 of FIG. 2a, the devices 5040, 5041, and 5043 of FIGS. 2b, 2c, and 2d, respectively, may include a continuous sequence of optical components connected by light guiding media such as, for example, optical fibers, planar waveguides, or planar circuits (PLC), which may be fabricated using integrated optic techniques and/or on-chip manufacturing. Alternatively, devices 5040, 5041, and 5043 may be constructed from discrete components, in which case the optical fibers may be replaced by open space or a non-solid medium, e.g., a gas medium, and the directional couplers may be replaced by any suitable alternative components, e.g., beam splitters. It should be understood that, in embodiments of the invention, some or all of the couplers, amplifiers and/or attenuators used may include variable and/or adjusted components.

Reference is made to FIG. 4a, which schematically illustrates an optical threshold device, denoted 5300, in accordance with exemplary embodiments of another aspect of the present invention. Reference is also made to FIG. 4b, which schematically illustrates an attenuator 314 that may be used in conjunction with exemplary embodiments of the device of FIG. 4a. The design of device 5300 may be beneficial because it is generally insensitive to the phase of the light signals and thus does not require a phase shifter or phase control. Device 5300 includes a symmetric directional coupler 5302 having an input terminal 5304 and an output terminal 5306. Additional two terminals 5308 and 5310 of coupler 5302 may be connected to each other via a loop 5312 in a configuration similar to a loop mirror, as described below. Loop 5312 may include an amplifier 5316 and attenuator 5314. Amplifier 5316 may include any suitable type of amplifier, for example, a SOA, LOA, or EDFA. Attenuator 5314, which may be connected between connection points 5313 and 5315 on loop 5312, may include any suitable type of attenuator, for example, a Variable Optical Attenuator (VOA). It should be appreciated that the attenuators and/or VOA's used in conjunction with embodiments of the present invention may be implemented in the form of any type of device that causes attenuation of signals, including devices not conventionally used for attenuation purposes. For example, in some embodiments, an attenuation function may be implemented by an optical amplifier, e.g., a SOA, a LOA, or an EDFA, excited to levels at which the amplifier absorbs rather than amplifies input signals. In some exemplary embodiments, attenuator 5314 may include a fixed or variable coupler 5314A, connected between connection points 5313 and 5315, as illustrated schematically in FIG. 4b. The attenuation factor of attenuator 5314 may be adjustable and may depend on the fraction of energy that coupler 5314A may transmit between points 5313 and 5315 as well as the fraction of energy that coupler 5314 may couple out via a set of terminals, denoted 5317 and 5317A. When an input pulse, such as pulse 5320, is received at input 5304 of device 5300, the input pulse may be split by symmetric coupler 5302, e.g., at a splitting ratio of 1:1, into ports 5308 and 5310, respectively. A split pulse 5330 transmitted by port 5310 may propagate counterclockwise (i.e., in the direction of arrow 5324) and its phase may be shifted, by coupler 5302, π/2 radians (i.e., crossbar transmission or crossover transmission). The split pulse 5328 transmitted by port 5308 may propagate clockwise (i.e., in the direction of arrow 5326) and its phase may be not be shifted by coupler 5302 (i.e., bar transmission).

It should be noted that if loop 5312 does not include a NLE component, such as amplifier 5316, the pulses 5330 and 5328 that propagate counterclockwise and clockwise, respectively, complete their travel around loop 5312 and return to ports 5308 and 5310, respectively, with equal amplitudes and the same relative phases. The relative phase is maintained because both pulses 5328 and 5330, which propagate in mutually opposite directions, travel exactly the same distance, i.e., the length of loop 5312. The amplitudes of pulses 5328 and 5330 returning to ports 5310 and 5308, respectively, are equal to each other because they travel through the exact same medium, which is symmetric and linear for both propagation directions. This means that pulse 5330 that returns to port 5308 is π/2 radian ahead with respect to pulse 5328 that returns to port 5310. On their return paths, each of pulses 5328 and 5330, upon arrival at ports 5310 and 5308, respectively, may be re-split into ports 5306 and 5304, e.g., at a 1:1 ratio for each split, wherein the crossover split produces a phase shift of π/2 radians and the bar split does not produce any phase shift. Accordingly, the crossbar split of pulse 5330 from port 5308 may destructively interfere with the bar split of pulse 5328 from port 5310, thereby to produce substantially zero output at output port 5306. At the same time, the crossbar split of pulse 5328 from port 5310 may constructively interfere with the bar split of pulse 5330 from port 5308, thereby to produce a reflected signal that carries substantially the entire energy of pulse 5320 reflected back to input port 5304. Normalizing the input energy of pulse 5320 to a value of 1, the energy at output port 5306, when loop 5312 does not includes NLE 5316, may be given by:

$$I_{5306} = A \cdot \left[ \frac{1}{\sqrt{2}} \cdot \frac{1}{\sqrt{2}} + \frac{j}{\sqrt{2}} \cdot \frac{j}{\sqrt{2}} \right]^2 = 0 \tag{6}$$

Where j indicates a phase shift of π/2 radians, and A is the intensity attenuation factor of attenuator 5314.

The energy reflected back to input port 5304 may be given by:

$$I_{5304} = A \cdot \left[ \frac{1}{\sqrt{2}} \cdot \frac{j}{\sqrt{2}} + \frac{j}{\sqrt{2}} \cdot \frac{1}{\sqrt{2}} \right]^2 = A \tag{7}$$

FIG. 5 schematically illustrates a graph showing the relative phase shift and intensity of the output signals of a NLE, for example, amplifier 5316 of FIG. 4a, versus the input signals for two different amplitudes of pulses that propagate in opposite directions. FIG. 5 is useful in analyzing the operation of device 5300 in FIG. 4a where loop 5312 includes amplifier 5316. In analogy to the graph in FIG. 1a, the graph of FIG. 5 shows the transmission function of the output intensity Io and the output phase shift Δφ of NLE amplifier 5316 versus the input intensity Ii. When lower level input pulse 5320 having a normalized field amplitude value of 1 is received by input 5304 of device 5300 in FIG. 4a, the field amplitude of split pulse 5330, denoted 5400 in FIG. 5, propagating in the counterclockwise direction indicated by arrow 5324 in FIG. 4a, is $1/\sqrt{2}$ at the entrance of amplifier 5316. Further, in this scenario, the field amplitude of split pulse 5328, denoted 5402 in FIG. 5, propagating in the clockwise direction indicated by arrow 5326 in FIG. 4a, is $\sqrt{A}/\sqrt{2}$ at the entrance to amplifier 5316. Factor A represents the level of power intensity attenuation resulting from attenuator 5314. Since both pulses, i.e., pulses 5400 and 5402, may be within the linear range of amplifier 5316, the two pulses may be amplified by amplifier 5316 by the same intensity gain factor $G_{linear}$. The two pulses are also attenuated by the same factor A at attenuator 5314. Accordingly, both pulses return to ports 5308 and 5310 after undergoing substantially the same attenuation, A, and the same amplification, $G_{linear}$. Thus, the amplitudes of the two pulses, after amplification and attenuation, may be substantially equal to each other.

As described above, pulses 5400 and 5402 enter amplifier 5316 of FIG. 4a with different field amplitudes, e.g., $1/\sqrt{2}$ and $\sqrt{A}/\sqrt{2}$, respectively. Accordingly, amplifier 5316 may shift the phases of pulses 5400 and 5402 by different amounts. However, since pulses 5400 and 5402 are low amplitude pulses, their phases may be shifted only by small shifts, $\Delta\phi_2$ and $\Delta\phi_{2'}$, respectively, yielding an even smaller additional relative phase shift, $d(\Delta\phi_2)=\Delta\phi_2-\Delta\phi_{2'}$, between the pulses. The influence of such additional relative phase shift is generally insignificant for the purposes of the invention. Accordingly, the additional relative phase shift produced by amplifier 5316 between pulses 5400 and 5402 is negligible and pulses 5400 and 5402 may return to ports 5308 and 5310 with amplitudes that are substantially equal to each other and with a relative phase shift substantially equal to their original relative phase shift, i.e., similar to the relative phase shift originally produced by coupler 5302, e.g., a phase shift of about π/2 radians.

Because the amplitudes of the pulses returning to ports 5308 and 5310 are substantially equal to each other, and due to the small influence of amplifier 5316 on the relative phases of pulses 5400 and 5402 for low level input signals, the behavior of device 5300 in this case may be generally similar to that of an analogous device (not shown) without amplifier 5316 in loop 5312. Accordingly, in the case of low level input signals, substantially all the energy of pulse 5320, after amplification by gain $G_{linear}$ and attenuation A, may be reflected back to input 5304. Based on the above, the intensity $I_{5306}$ at output port 5306 and the intensity $I_{5304}$ reflected back to port 5304 may be given by the following equations:

$$I_{5306} = G_{linear} \cdot A \cdot \left[ \frac{1}{\sqrt{2}} \cdot \frac{1}{\sqrt{2}} + \frac{j}{\sqrt{2}} \cdot \frac{j}{\sqrt{2}} \right]^2 = 0 \quad (8)$$

$$I_{5304} = G_{linear} \cdot A \cdot \left[ \frac{1}{\sqrt{2}} \cdot \frac{j}{\sqrt{2}} + \frac{j}{\sqrt{2}} \cdot \frac{1}{\sqrt{2}} \right]^2 = G_{linear} \cdot A$$

where $G_{linear}$ represents the intensity amplification gain within the linear range.

The desired situation in which substantially all the energy of the low level input pulse may be reflected back into the input and there is substantially no signal at the output may be achieved by using symmetric couplers, such as coupler 5302. In contrast, devices such as the device described in the '979 patent mentioned above, are based on using an asymmetric coupler in the entrance to a loop mirror, wherein the asymmetric coupler is an essential element of the device. It should be appreciated that the above described feature of the present invention, whereby substantially all the energy of the low level input pulse is reflected back to the input, leaving substantially no signal at the output, cannot be achieved in devices based on using asymmetric coupler at the entrance to the loop mirror, such as that disclosed in the '979 patent.

For higher-level input pulses, for example, pulse 5322 in FIG. 4a, having field amplitude H, the counterclockwise split pulse 5404 may enter amplifier 5316 with a field amplitude H/√2, which falls within the saturation range of amplifier 5316. The clockwise split pulse 5406 may enter amplifier 5316 with a field amplitude √A·H/√2, which falls within the linear range of amplifier 5316. Counterclockwise split pulse 5404 is amplified by amplifier 5316 by intensity gain factor $G_{sat}$, which is smaller than $G_{linear}$ due to the reduced gain in the saturation region, and the phase of pulse 5404 is shifted by the same amplifier 5316 by $\Delta\phi_1 = \Delta\phi_{sat}$. Clockwise split pulse 5406 is amplified by amplifier 5316 by gain factor $G_{linear}$, in the linear region, and the phase of pulse 5406 is shifted by the same amplifier 5316 by $\Delta\phi_{1}$. Although the ratio between low amplitude pulses 5400 and 5402 may be similar to the ratio between higher amplitude pulses 5404 and 5406, namely, a ratio equal to one divided by the field amplitude attenuation factor √A, the difference between the amplitudes of pulses 5404 and 5406 may be much larger than the difference between the amplitudes of pulses 5400 and 5402. Accordingly, the relative phase shift between high level pulses 5404 and 5406, denoted $d(\Delta\phi_1) = (\Delta\phi_{sat} - \Delta\phi_1)$, may be much larger than the relative phase shift between low level pulses 5400 and 5402, denoted $d(\Delta\phi_2)$. This means that pulses 5404 and 5406 return to ports 5308 and 5310 with different field amplitudes $\sqrt{G_{sat}} \cdot \sqrt{A} \cdot H/\sqrt{2}$, $\sqrt{G_{linear}} \cdot \sqrt{A} \cdot H/\sqrt{2}$, respectively, and significant different phase shifts, $\Delta\phi_{sat}$ and $\Delta\phi_1$, respectively.

Thus, for such high level inputs, when choosing the proper length of amplifier 5316, $d(\Delta\phi_1)$ may be adjusted to be equal to π radians while still maintaining a negligible value, $d(\Delta\phi_2)$, of the relative phase shift for low-level input amplitudes. When $d(\Delta\phi_1)$ is equal to π radians, a relatively large fraction of the energy of the higher-level input pulse 5322 may be emitted out by device 5300 through its output 5306 and only a small fraction may be reflected back through input 5304. In this case, the output intensity $I_{5306}$ and the intensity $I_{5304}$ reflected back into input 5304 may be given by:

$$I_{5306} = H^2 \cdot A \cdot \left[ \frac{\sqrt{G_{linear}}}{\sqrt{2}} \cdot \frac{1}{\sqrt{2}} + \frac{\sqrt{G_{sat}}}{\sqrt{2}} \cdot \frac{1}{\sqrt{2}} \right]^2 \neq 0 \quad (9)$$

$$I_{5304} = H^2 \cdot A \cdot \left[ \frac{\sqrt{G_{linear}}}{\sqrt{2}} \cdot \frac{j}{\sqrt{2}} - \frac{j}{\sqrt{2}} \cdot \frac{\sqrt{G_{sat}}}{\sqrt{2}} \right]^2$$

In the above discussion, device 5300 is analyzed for the case where the reduced amplitude pulse 5406 is in the linear region of amplifier 5316 and the unreduced amplitude pulse 5404 is in the saturated region of that amplifier. It should be noted that there are at least two additional settings relevant to describing effective operation of device 5300. In a first additional setting, pulses 5406 and 5404 have the same gain $G_{linear}$; however, the phase sifts produced for the two pulses by amplifier 5316 are different. In a second additional setting, amplifier 5316 shifts the phases of pulses 5406 and 5404 by the same amount $\Delta\phi_1 = \Delta\phi_{sat}$; however, the gains produced for the two pulses by amplifier 5316 are different.

It should be appreciated that the analysis of device 5300 for the two additional settings of device 5300, in the case of low level input signals, may be generally the same as discussed above with reference to the case where no output signal is produced. Therefore, the two additional settings of device 5300 are not further analyzed herein in the context of low-level input signals.

Analyzing device 5300 in the range of high input signals, according to the first additional setting, it is noted that pulses 5406 and 5404 are both in the linear region of amplifier 5316. In this case, when amplifier 5316 is sufficiently long, when the length of the amplifier is appropriately adjusted and when attenuation factor A is adjusted to produce the proper ratio between pulses 5404 and 5406, the relative phase shift $d(\Delta\Phi_1)$ may be adjusted to be equal to π radians even when the amplitude of pulse 5404 is still in the linear range. Accordingly, pulses 5404 and 5406 are amplified by the same factor $G_{linear}$. Therefore, $G_{sat}$ may be replaced by $G_{linear}$ in the above equations 9, taking into account phase inversion. In this first additional setting, for high-level input signals, the entire energy may be emitted from output port 5306 and substantially no energy may be reflected back through input 5304.

According to the second additional setting, analyzed for the case of high level input signals, the amplitude of pulse 5406 may be sufficiently high to be included in the saturated range of amplifier 5316 and, thus, amplifier 5316 may not produce any relative phase shift $d(\Delta\phi_1)$ between pulse 5406 and pulse 5404, because both pulses are in the saturated region of amplifier 5316. However, since pulse 5404 may be at a much deeper saturation level than pulse 5406, pulse 5404 may have a gain, $G_{sat1}$, that is much lower than the gain, $G_{sat2}$, of pulse 5406. In this case, the transmitted intensity $I_{5306}$ and the reflected intensity $I_{5304}$ may be given by:

$$I_{5306} = H^2 \cdot A \cdot \left[ \frac{\sqrt{G_{lsat2}}}{\sqrt{2}} \cdot \frac{1}{\sqrt{2}} - \frac{\sqrt{G_{sat1}}}{\sqrt{2}} \cdot \frac{1}{\sqrt{2}} \right]^2 \neq 0 \quad (10)$$

$$I_{5304} = H^2 \cdot A \cdot \left[ \frac{\sqrt{G_{lsat2}}}{\sqrt{2}} \cdot \frac{j}{\sqrt{2}} + \frac{j}{\sqrt{2}} \cdot \frac{\sqrt{G_{sat1}}}{\sqrt{2}} \right]^2$$

Accordingly, device 5300 may operate as a threshold device that produces substantially no output signal for lower level input signals, while emitting a large fraction of the energy of higher level input signals through its output 5306. It is clear that, for all the versions of device 5300 described above, the larger the ratio between pulses 5404 and 5406, the larger the relative phase shift $d(\Delta\phi_1)$ between the pulses and the larger the different between $G_{linear}$ and $G_{sat}$, resulting in improved operation of device 5306 for the higher level input signals. It should be appreciated that, in device 5300 according to exemplary embodiments of the present invention, there may be virtually no limitation on the ratio between pulses 5404 and 5406, and the ratio may be as desired, for example, equal to one over the attenuation factor of attenuator 5314. Further, in view of the above analysis, it should be appreciated that although the use of a large attenuation factor, i.e., a small value for A, may improve the performance of device 5300 in the range of higher level input signals, such large attenuation does not degrade the performance of device 5300 in the range of lower level input signals.

It is noted that a high ratio between pulses is also desired for devices such as that described in the '979 patent mentioned above; however, in contrast to the present invention, the allegedly high ratio achieved by the device described in the '979 patent results from the asymmetry of the input coupler of the device. To produce the desired ratio according to the device described in the '979 patent, the level of asymmetry of the asymmetric coupler must be very significant, preventing the device from blocking lower level input signals, thereby limiting and/or compromising the performance of such a device.

It is appreciated that, in contrast to prior art devices, such as the device described in the '979 patent, where performance must be compromised, at least for either the low-level input signals or the high-level input signals, there is no such compromise in device 5300 according to the present invention.

Referring again to FIG. 4*a*, a virtual mid point 5318 divides loop 5312 into two halves, wherein each half has an equal length, S, representing the distance from port 5310 to mid point 5318 or from port 5308 to mid point 5318. It is noted that the counterclockwise pulse 5330 and the clockwise pulse 5328 inherently meet and overlap each other at mid point 5318. When streams of pulses that are separated from each other by time periods, T, enter loop 5312 of device 5300, and split into clockwise and counterclockwise streams, a pulse in the counterclockwise stream, such as pulse 5330, meets a pulse in the clockwise stream, such as pulse 5328, every half time period, T/2. This means that after every distance X=T/2·C/n, wherein C is the speed of light in vacuum and n is the refractive index of the optical guides, there is a meeting ("collision") point between pulses that propagate in loop 5312 in opposite directions. To avoid such collisions from occurring at the NLE, e.g., at amplifier 5316, the location of the NLE should be off center by a distance $\delta S$ that may be given by:

$$l \cdot X < \delta S < m \cdot X \quad (11)$$

where X is the above given distance between two adjacent meeting (collision) points and l and m are consecutive integers. For the specific example of l=0 and m=1, Equation 11 may be reduced to: $\delta S < X$.

When a low amplitude pulse, such as pulse 5406, enters amplifier 5316 first, the pulse does not deplete an inverse population of the amplifier and, thus, a higher amplitude pulse 5404 may enter the NLE immediately following the exit of pulse 5406. In a situation when the order of the locations of amplifier 5316 and attenuator 5314 is reversed, the higher amplitude pulse may enter NLE 5316 first. In this reverse order case, the higher amplitude pulse may deplete the inverse population of amplifier 5316 and, thus, a recovery time $\Delta\tau$ may be needed for amplifier 5316 to build an inverse population before entry of a lower amplitude pulse. Therefore, in the latter case, or in a situation where the stream of input pulses includes only high amplitude pulses, T/2 may be longer than $\Delta\tau$.

As discussed above, the efficiency of device 5300 may be improved by increasing the ratio between the higher and the lower levels included in the input signal. Further, the output signals produced by device 5300 that correspond to different levels of input pulses have a more distinctive amplitude ratio than the ratio between their respective input pulses. Accordingly, an improved threshold system in accordance with exemplary embodiments of the present invention may include a configuration of a more than one device 5300, for example, at least two devices 5300 connected in series, wherein the output signals from one device 5300 may be fed directly into the input of a subsequent device 5300. Such a configuration may be used to improve threshold capability by further accentuating the distinction between lower and higher amplitude pulses.

Figure 6:
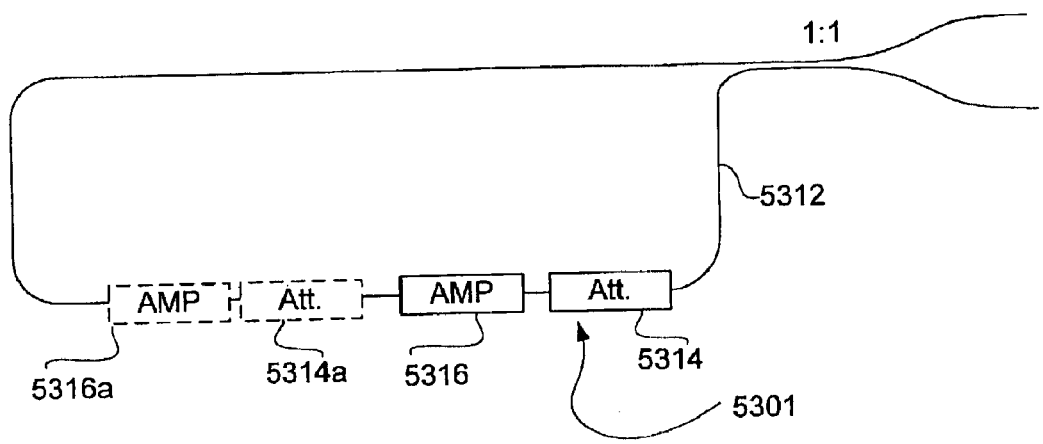
FIG. 6 is a schematic illustration of an alternative design for a threshold device including a non-linear optical loop according to exemplary embodiments of the present invention.

Referring to FIG. 6, a threshold device 5301 in accordance with further exemplary embodiments of the invention is shown. The design of device 5301 is a modified version of the design of device 5300. In addition NLE-attenuator functionality, which may be performed by amplifier 5316 and attenuator 5314, as described above with reference to device 5300, device 5301 includes additional NLE-attenuator functionality, which may be embodied in the form of an amplifier 5316*a* and an attenuator 5314*a*. As discussed above with reference to optimizing the operation of device 5300, the length of amplifier 5316 may be adjusted to produce a relative phase shift $d(\Delta\phi_1)$ equal $\pi$ radians. However, since the required adjusted length for amplifier 5316 in device 5300 may not be commercially available and may be difficult to produce, the additional set of amplifier 5316*a* and attenuator 5314*a* may be added to enable such adjustment. In this case the required length of each amplifier (5316 or 5316*a*) of device 5301 may be about half of the required length required for the single amplifier 5316 in device 5300. In some alternative embodiments, similar relative phase shifting may be achieved by adding only amplifier 5316*a*, i.e., without using attenuator 5314*a*; however, the addition of attenuator 5314*a* may useful to enable a further increase of the amplitude ratio between the counterclockwise and the clockwise signals propagating in loop 5312.

Figure 7:
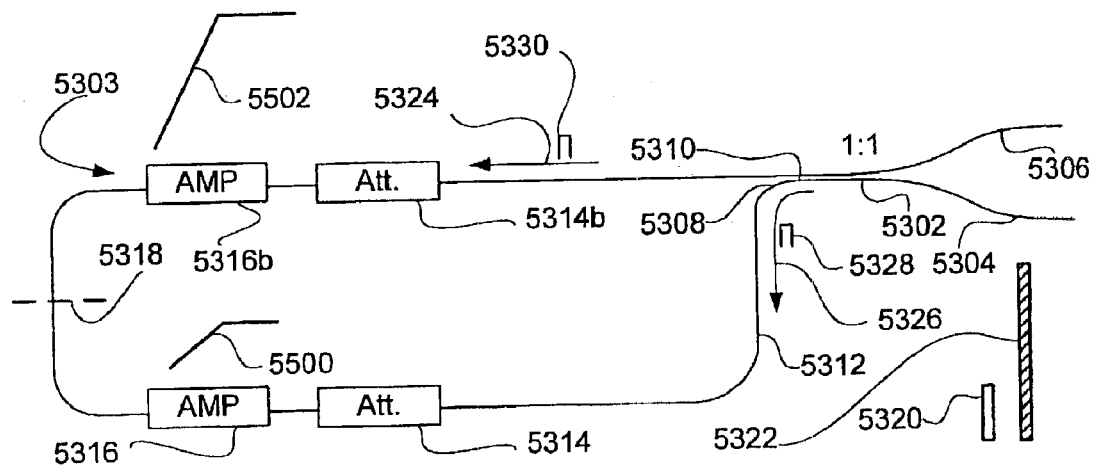
FIG. 7 is a schematic illustration of another alternative design for a threshold device including a non-linear loop structure according to exemplary embodiments of the present invention.

FIG. 7 schematically illustrates a device 5303, which is a variation of the design of device 5300 of FIG. 4*a*. Device 5303 may enable expansion of the range of lower level input signal for which the very high performance and output signals very close to zero may be obtained. As shown in FIG. 7, device 5303 has generally the same structure as device 5300, with the addition of an amplifier 5316*b* and an attenuator 5314*b*. Except for amplifier 5316*b* and attenuator 5314*b*, identical reference numerals are used in FIGS. 4*a* and 7 to indicate components with identical or similar structure and functionality. The parameters of attenuator 5314b and amplifier 5316b may be generally identical to those of attenuator 5314 and amplifier 5316, respectively; however, amplifier 5316b may be excited to a higher excitation level than amplifier 5316. Transmission functions of amplifiers 5316b and 5316 are roughly illustrated by symbols 5502 and 5500, respectively, in FIG. 7.

For lower level input signals, such as pulse 5320, amplifiers 5316b and 5316 both operate at their linear region in a similar way and, thus, loop 5312 may be quasi-symmetric and the entire energy of the input signal may be reflected back into input 5304. However, the range of the low level input signals for which the output signals are very close to zero is expanded in device 5303 relative to device 5300. This range expansion is possible because the quasi-symmetric configuration of loop 5312 is maintained in device 5303 for a wider range of input amplitudes due to a phase shift compensation produced by amplifier 5316b to compensate for the small phase shift that amplifier 5316 may produce, as described in detail above. Since amplifiers 5316 and 5316b are excited to different levels of excitations, their gain and phase shifts may not be identical and, therefore, it is appreciated that the phase shift compensation of amplifier 5316b applied to the phase shift of amplifier 5316 may not be perfect. However, since the phase shifts produced by amplifiers 5316 and 5316b in the range of low level input signals is generally small, the difference between these phase shifts (after the compensation) is smaller yet and has no significant influence on the operation of device 5303 over a wider range of lower level input signals.

For higher-level input signals, such as pulse 5322, the additional amplifier 5316b is still within the range of small phase shifts in the linear region and may operate quasi-symmetrically for both counterclockwise and clockwise pulses, such as pulses 5330 and 5328. Thus the set of amplifier 5316b and attenuator 5314b maintains their quasi-symmetry even for the higher-level input signals. However, amplifier 5316 having a saturation level that is lower than the saturation level of amplifier 5316b is driven into a saturation state by the counterclockwise pulses 5330 it receives, yet the amplifier is not driven into saturation by the clockwise pulses 5328 it receives. Accordingly, in this situation, the set of amplifier 5316 and attenuator 5314 "breaks" the symmetry of loop 5312 in a way similar to that explained above with reference to device 5300 of FIG. 4a. At the same time, the set of amplifier 5316b and attenuator 5314b has little influence on the symmetry of loop 5312. Accordingly, in this situation, for higher-level input signal, only amplifier 5316 and attenuator 5314 have a significant role in the production of output signals, whereby device 5303 operates in this range in a manner similar to the operation of device 5300 as discussed above with reference to FIG. 4a.

In accordance with embodiments of the invention, each of devices 5301 and 5303 may have a "turn on" point, which may function as a threshold level. For low-level input signals in the range, e.g., below the "turn on" threshold level, output signals are strongly attenuated by destructive interference at the output port of the devices and the transmission function between the input and the output of these devices includes a monotonic range with a shallow slope. For high-level input signals, e.g., in a range above the "turn on" threshold level, the output signal at the output port of the devices increases sharply and the transmission function between the input and the output of these devices may include a range having a steep monotonic slope.

Adjustable parameters that may be used to adjust the "turn on" threshold may include but are not limited to the gain G and the length L of amplifiers 5316, 5316a and 5316b, and the attenuations of attenuators 5314, 5314a and 5314b. The excitation levels, the gains, and the attenuations of the different amplifiers and attenuators may be different for each amplifier and/or attenuator.

Devices 5300, 5301 and 5303 of FIGS. 4, 6, and 7, respectively, may include a continuous sequence of optical components connected by light guiding media such as, for example, optical fibers, planar waveguides, or planar circuits (PLC), which media may be fabricated using integrated optic techniques and/or on-chip manufacturing. Alternatively, devices 5300, 5301 and 5303 may be constructed from discrete components, in which case the optical guiding media may be replaced by open space, e.g., vacuum, or by a non-solid, e.g., gaseous media, and the directional couplers may be replaced with beam splitters. It should be understood that all amplifiers and attenuators include variable and/or adjustable components.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

We claim:

1. An optical threshold device comprising:
    an input;
    an output;
    first and second radiation guiding branches, each branch having first and second terminals, at least one of said first and second branches comprising a non-linear optical element;
    first and second optical couplers, at least one of said first and second optical couplers comprising an asymmetric optical coupler, said first optical coupler configured to split an input signal of radiation from said input into a first radiation portion propagating through said first branch and a second radiation portion propagating through said second branch, said second optical coupler configured to combine said first and second radiation portions from the second terminals of said first and second branches, respectively, into an output signal at said output,
    wherein said non-linear optical element produces a phase shift between said first and second radiation portions and wherein said first and second radiation portions interfere at said second coupler in response to said phase shift.

2. The device of claim 1 wherein the interference between said first and second radiation portions at said second coupler is at least partly destructive when the intensity of said input signal is below a predetermined threshold level and at least partly constructive when the intensity of said input signal is above said threshold level.

3. The device of claim 1 wherein each of said first and second branches comprises a non-linear optical element.

4. The device of claim 3 wherein the non-linear optical elements of said first and second branches are excited to different excitation levels.

5. The device of claim 3 wherein at least one of said first and second branches comprises an optical attenuator.

6. The device of claim 1 wherein said non-linear optical element comprises a non-linear optical element selected from the group consisting of an element including a solid state optical amplifier, a linear optical amplifier, and an Erbium doped fiber amplifier.

7. The device of claim 1 wherein the amplitude of the output signal at said output is responsive to a phase shift produced by said non-linear optical element.

8. The device of claim 1 wherein the amplitude of the output signal at said output is responsive to a gain function of said non-linear optical element.

9. The device of claim 1 wherein the amplitude of the output signal at said output is responsive to a phase shift and gain function of said non linear element.

10. The device of claim 1 wherein said predetermined threshold level is set by adjusting at least one parameter selected from the group consisting of a splitting ratio of said first optical coupler, a combining ratio of said second optical coupler, an excitation level of said non-linear optical element, and a gain of said non-linear optical element.

11. The device of claim 1 wherein at least one of said first and second branches and said input is operatively associated with an optical attenuator.

12. The device of claim 1 wherein at least one of said input and said output is operatively associated with an optical amplifier.

13. The device of claim 1 wherein said input is operatively associated with an optical amplifier and an optical attenuator.

14. The device of claim 1 wherein said first optical coupler comprises a symmetric optical coupler.

15. The device of claim 1 wherein said second optical coupler comprises a symmetric optical coupler.

16. The device of claim 1 wherein at least one of said first and second branches comprises an optical phase shifter.

17. The device of claim 16 comprising a closed optical phase-control loop to controllably adjust said phase shifter.

18. The device of claim 17 wherein said closed optical phase-control loop comprises a controller arranged to tap a fraction of the output signal from said output and to adjust said optical phase shifter to maintain a predetermined relative phase between the radiation portions at the second terminals of said first and second branches.

19. The device of claim 17 wherein said closed optical phase-control loop has a response time shorter than a time period of said input signal.

20. The device of claim 17 wherein said closed optical phase-control loop comprises an averaging integrator.

21. The device of claim 1 comprising at least one optical fiber.

22. The device of claim 1 comprising at least one planar waveguide.

23. The device of claim 1 comprising integrated optics.

24. The device of claim 1 comprising a planar optical circuit.

25. The device of claim 1 comprising an on-chip optical device.

26. The device of claim 1 wherein said radiation is guided at least partly in a gaseous medium or vacuum.

27. The device according to claim 26 wherein at least one of said first and second optical couplers comprises a beam splitter.

28. An optical threshold device comprising:

an input;

an output;

first and second radiation guiding branches, each branch having first and second terminals, at least one of said first and second branches comprising a non-linear optical element and at least one of said first and second branches comprising an optical attenuator;

first and second optical couplers, said first optical coupler configured to split an input signal of radiation from said input into a first radiation portion propagating through said first branch and a second radiation portion propagating through said second branch, said second optical coupler configured to combine said first and second radiation portions from the second terminals of said first and second branches, respectively, into an output signal at said output, wherein said non-linear optical element produces a phase shift between said first and second radiation portions and wherein said first and second radiation portions interfere at said second coupler in response to said phase shift.

* * * * *